United States Patent Office 2,713,546
Patented July 19, 1955

2,713,546

STABILIZED LOWER FATTY ACID ESTER OF CELLULOSE

Robert F. Williams, Jr., Rochester, N. Y., assignor to Eastman Kodak Company, Rochester, N. Y., a corporation of New Jersey No Drawing. Application January 25, 1952, Serial No. 268,337

10 Claims. (Cl. 106—176)

This invention relates to stabilized cellulose esters of lower fatty acids which may be subjected to high temperatures in the air without developing color or loss of chain length and which are prepared by treating the ester with a neutralizing agent, then incorporating therein a small amount of a substituted phenol and preferably with the addition of a glycidyl ether.

Ordinarily organic acid esters of cellulose are prepared by reacting upon the cellulose with an organic acid anhydride, such as acetic or butyric anhydride, in the presence of sulfuric acid catalyst. The product thus obtained contains a small proportion of combined sulfur in the form of a sulfuric acid residue. If this combined sulfur is not neutralized, the resulting cellulose ester will develop free acidity during its life. On the other hand, if the sulfuric acid residue is neutralized, the salts present in the cellulose ester as a result of that neutralization may accelerate discoloration of the ester or a composition containing the same when exposed to ultraviolet light or heat.

One object of my invention is stabilized cellulose esters and compositions thereof against the effect of heating in an oxygen-containing atmosphere. Another object of my invention is compositions in which the undesirable effect of any salts therein at elevated temperatures is minimized so that objectionable discoloration does not occur. A further object of my invention is stabilized cellulose esters by incorporating substituted phenols therein. A still further object of my invention is cellulose ester compositions having good stability at severe temperatures, such as at 250° C. Other objects of my invention will appear herein.

I have found that the effect of atmospheric oxygen on cellulose esters at elevated temperatures can be considerably reduced if the cellulose esters are treated with neutralizing agents so as to completely neutralize the sulfuric acid residue therein and mixed with a small proportion of a substituted phenol to minimize any oxidation of the cellulose ester at an elevated temperature. I have also found that when both a substituted phenol and a glycidyl ether are incorporated in the cellulose ester, most severe temperature conditions can be employed in its use without experiencing serious discoloration or undue reduction of chain length of the cellulose ester.

It is essential to the stabilizing of cellulose esters, in accordance with my invention, that the sulfur acid residue therein be completely neutralized. It is preferred that this neutralization be accomplished using magnesium, calcium, barium or aluminum salts such as the formates, acetates, lactates, citrates or the like, although other neutralizing agents, such as potassium acid oxalate or other alkali metal salts of weak acids, may be employed. The neutralization of the sulfuric acid residue of the cellulose ester may be accomplished in various ways. For instance, the sulfuric acid present in the completed esterification bath may be neutralized, such as by magnesium carbonate or magnesium oxide, prior to its precipitation therefrom. Instead of, or in addition thereto, the cellulose ester may be treated after its precipitation with a neutralizing agent, such as the formate of magnesium, barium, calcium or aluminum, as disclosed in application Serial No. 127,516 now U. S. Patent No. 2,614,941, or with potassium acid oxalate, so that the mineral acid residue is completely neutralized, following which the cellulose ester may be washed, if desired, and dried. Instead of, or in addition to, either of these treatments, the sulfuric acid residue may be neutralized by incorporating a neutralizing agent in the final wash water for the cellulose ester, in the drying operation or even in the compounding of the dry ester with plasticizer or other materials to form a plastic composition, the neutralizing agent being incorporated in the latter method either dry or in the form of an aqueous solution thereof. In the case of the cations, magnesium, barium, calcium or aluminum, it is desirable that they be present in the ratio of 1 mol thereof per mol of sulfuric acid residue of the cellulose ester, although the use of 1–3 mols of neutralizing agent per mol of sulfuric acid residue has been found to be satisfactory. In the case of cations other than Mg, Ba, Ca and Al, it is usually desirable to confine the amount thereof used to that substantially equivalent to the sulfuric acid residue in the cellulose ester. The neutralization of the sulfuric acid residue should be of such nature that the so-treated cellulose ester does not drop its intrinsic viscosity more than 50% when it is heated for one-half hour at 250° C.

Incorporated in the cellulose ester, the sulfuric acid residue of which has been completely neutralized, is a substituted phenol. I have found that, for best results, the amount of substituted phenol which may be incorporated is 0.2%. Nevertheless, proportions as low as .05% have been found to be operative. In other cases, plasticizing amounts of substituted phenol have been employed, such as up to 25%, while in other cases amounts up to 2–5% have been found useful. I have found that cellulose esters, the sulfuric acid residue of which has been completely neutralized as indicated, when mixed with substituted phenols have shown good stability as to color and viscosity at temperatures as high as 205° C. or even higher. Some of the substituted phenols which have been found to be useful for stabilizing such esters, in accordance with my invention, are thymol, eugenol, guaiacol, carvacrol, 2-methoxy-4-methyl phenol, dimethyl phenol, trimethyl phenol, o-iso-propyl phenol and tert-butyl phenol. These compounds have been found to be particularly useful because they are characterized by (1) compatibility with cellulose esters, (2) high boiling point, (3) greater reactivity with oxygen than cellulose esters, (4) absence of color and (5) high temperature stability.

I have found that cellulose esters, treated as described above, are still more resistant to high temperatures if, in addition to the incorporation of substituted phenol in the cellulose ester and the neutralization of its mineral acid residue, a small amount of glycidyl ether is also incorporated therein, the amount incorporated being within the range of .01–5%. Any of the glycidyl ethers which have been specified in Malm and Williams application Serial No. 127,515 now U. S. Patent No. 2,670,302 may be employed in this connection. However, I have found that resorcinol diglycidyl ether and hydroquinone diglycidyl ether are especially useful for this purpose. I have found that by incorporating both glycidyl ether and substituted phenol in cellulose esters in which the sulfuric acid residue is neutralized, the resulting products obtained are resistant to the effects of temperatures as high as 250° C. for substantial periods of time, even though exposed to the oxygen of the air.

Cellulose esters prepared in accordance with my invention are useful for the preparation of plastic compositions therefrom, for instance, by mixing those esters with 0–50% of a plasticizer, particularly a plasticizer which is heat stable. A heat stable plasticizer may be defined as one which will not discolor ash-free filter paper saturated therewith when subjected to a temperature of 250° C. (Analytical Chemistry 23, 1692–94, 1951). If a plasticizer is found to be unstable to heat, it may be stabilized by adding thereto a small amount of a glycidyl ether. Normally, .25% of glycidyl ether is sufficient to stabilize a plasticizer otherwise unstable to heat, but in some cases further addition of glycidyl ether is necessary, providing, of course, the plasticizer is one which can be rendered heat stable by such addition. Some plasticizers which are useful for plasticizing cellulose acetate butyrate are dibutyl sebacate, 2-ethyl hexyladipate, di-2-ethyl hexyl phthalate, dibutyl phthalate and the like. Some plasticizers useful for plasticizing cellulose acetate are dimethyl phthalate, tripropionin, triacetin and the like. The heat stability of any particular sample of plasticizer cannot be predetermined from its chemical nomenclature in any given case.

The incorporation of the substituted phenol into a cellulose ester, in accordance with my invention, may be in any convenient manner; for instance, in either the comminuting of the cellulose ester or its compounding with plasticizers to form plastic compositions, the substituted phenol may be added during the operation. If desired, however, the substituted phenol may be dissolved in a solvent, such as alcohol, and this solution may be sprayed onto the cellulose ester while in dry form. As the purpose of the substituted phenol is to protect the cellulose ester against elevated temperatures, it is, of course, desirable, in accordance with my invention, that the phenol be thoroughly incorporated into the cellulose ester or into a composition thereof prior to subjecting the high temperatures. The cellulose esters, in accordance with my invention, are particularly adapted for use in molding compositions or compositions which are to be employed in preparing extruded products, in which uses high temperatures are employed. My invention is adapted for stabilizing lower fatty acid esters of cellulose, either cellulose acetates or cellulose esters in which other acyl groups are present in either small or large proportion, such as cellulose acetate butyrate, cellulose acetate propionate, cellulose propionate or cellulose butyrate. It may be desirable in some cases that the cellulose esters, after the neutralization of the sulfuric acid residue, be given a thorough washing in distilled or demineralized water to remove a large percentage of the mineral content therefrom. This is particularly useful in cases where cellulose ester products of high clarity are to be prepared.

One useful type of cellulose esters which may be stabilized by my invention is the butyric acid esters of cellulose which have a butyryl content of at least 35%. These may be, for instance, cellulose acetate butyrates having butyryl contents of approximately 38%, cellulose butyrates having butyryl contents of approximately 50% or other esters having butyryl contents of at least 35%. These esters are useful due to their resistance to the effects of moisture. Another type of cellulose esters, the stabilizing of which by my invention is of value, is the cellulose acetates having an acetyl of at least 43%, commonly known as triacetates. These esters are also characterized by superior resistance to moisture, and hence are useful as regards minimum dimensional change. However, any of the cellulose esters of the fatty acids of 2–4 carbon atoms are increased in value by stabilizing them to the effect of elevated temperatures in accordance with my invention.

The following examples illustrate the effectiveness of stabilizing cellulose esters in accordance with my invention:

Example 1

A cellulose acetate, having an acetyl content of 43.5%, a sulfur content of 0.004% and an ash content of 0.02%, and whose intrinsic viscosity in formic acid was 2.03, was boiled in a distilled water solution of barium formate, whereby the sulfur content of the ester was completely neutralized. The ester thus obtained was then washed twice with distilled water. Various mixtures of the ester with substituted phenols, either with or without plasticizer, were prepared and were subjected to heat for one-half hour at 250° C. The resulting material was tested for color and for intrinsic viscosity in formic acid, and the following results were obtained:

| Gram of substituted phenol per 100 grams ester | Plasticizer | After heating ½ hr. at 250° C. | |
|---|---|---|---|
| | | Color | Intrinsic Vis. in HCOOH |
| 0 | 0 | 75 | 1.08 |
| 0.5 Thymol | 0 | 6 | 2.03 |
| Do | dimethyl phthalate | 6 | 1.70 |
| 0.1 Eugenol | 0 | 8 | 1.78 |
| Do | dimethyl phthalate | 4 | 1.83 |
| 1.0 Guaiacol | | 10 | 2.03 |
| Do | diethyl phthalate | 15 | 1.78 |
| 0.5 Carvacrol | | 10 | 1.48 |
| Do | dimethyl phthalate | 4 | 1.90 |
| 0.5 2-methoxy-4-methyl phenol | | 15 | 2.00 |
| Do | diethyl phthalate | 15 | 1.80 |
| 0.1 Tri-methyl-phenol | | 8 | 1.34 |
| Do | dimethyl phthalate | 2 | 1.83 |
| 0.5 o-iso-propyl-phenol | | 8 | 1.78 |
| 0.5 p-tert-butyl-phenol | | 8 | 1.32 |

Example 2

A cellulose acetate butyrate which had been prepared from wood pulp using a sulfuric acid catalyst, which ester had a residue of combined sulfuric acid therein, and contained 13% acetyl and 36.5% butyryl was purified by washing in permutit-softened water, and the sulfuric acid residue therein was completely neutralized by treating with .015% potassium acid oxalate before drying. The ester, when dry, had an intrinsic viscosity in acetic acid of 1.90. The ester was heated at 205° C., as indicated below, both alone, when compounded with plasticizer and when compounded with substituted phenol and plasticizer. The results obtained upon testing for color and intrinsic viscosity were as follows:

| Grams of substituted phenol per 100 grams ester | Plasticizer | Color after 1 hr. at 205° C. | Intrinsic Vis. in HAc after 2 hrs. at 205° C. |
|---|---|---|---|
| 0 | | 10 | 0.73 |
| 0 | Bu Seb | 8 | 0.66 |
| 0.1% tri-methyl-phenol | Bu Seb | 2 | 1.11 |
| 1.0% tri-methyl-phenol | Bu Seb | 2 | 1.11 |
| 0.1% thymol | Bu Seb | 0 | 1.05 |
| 1.0% thymol | Bu Seb | 2 | 1.08 |

Example 3

A cellulose acetate butyrate was prepared from cotton linters using a sulfuric acid catalyst. The ester had an acetyl content of 13.1%, and a butyryl content of 36.5%. The mineral acid residue of the ester was completely neutralized with magnesium acetate, and the ester was purified by washing with permutit-softened water. The ester exhibited an intrinsic viscosity of 1.85 in acetic acid. The ester was heated at 205° C., as indicated below, in one case without any substituted phenol being present therein, and in the other cases with the indicated amounts of various substituted phenols incorporated therein. The resulting material was then tested, and the values obtained, both as to color and as to intrinsic viscosity, were as follows:

| Grams of substituted phenol per 100 grams of ester | Stability after 1 hr. at 205° C. | |
|---|---|---|
| | Color | Intrinsic Vis. in HAc |
| 0 | 15 | 0.42 |
| 0.5 thymol | 0 | 1.40 |
| 1.0 tri-methyl-phenol | 2 | 1.32 |
| 0.5 2-methoxy-4-methyl phenol | 2 | 1.32 |

*Example 4*

A cellulose acetate butyrate, having an acetyl content of approximately 36.5% and which was prepared using a sulfuric acid catalyst, which ester contained a sulfuric acid residue which had not been neutralized, was subjected to heating for 1 hour at 205° C., both in the case where it was mixed with 0.005% potassium oxalate, which completely neutralized the mineral acid residue, and in the case where it was mixed with 0.005% of potassium acid oxalate and .2% of paratertiary butyl phenol. Esters from 4 different batches were employed. The colors obtained without using the substituted phenol were 8, 8, 6 and 6. Where the phenol was present, the color values obtained were 2, 4, 4 and 2. Also, the viscosities in acetic acid were tested. Where the substituted phenol was not employed, the intrinsic viscosities in acetic acid of the cellulose esters which had been heated were 0.73, 0.95, 1.02 and 1.02. With the same samples, but having substituted phenol incorporated therein, the intrinsic viscosity values of the cellulose esters, after their heating, were 1.34, 1.32, 1.40 and 1.32. Compositions were again made up of these 4 esters with 0.005% potassium acid oxalate only, and with this amount of salt, plus .2% of resorcinol diglycidyl ether, plus .2% of paratertiary butyl phenol. These samples were heated for one-half hour at 250° C. Those containing only the salt gave color values of 20, 40, 50 and 20. The color values of the corresponding samples, but containing glycidyl ether and substituted phenol, were 8, 8, 8 and 10. The intrinsic viscosities in acetic acid of the resulting materials were also tested. The viscosities where only the salt had been employed were 0.89, 0.83, 0.89 and 0.99. The intrinsic viscosities of the products obtained where a glycidyl ether and a substituted phenol had also been incorporated were 1.29, 1.26, 1.32 and 1.26. The intrinsic viscosities of the original compounded esters before heating were 1.57, 1.65, 1.65 and 1.67, respectively.

The color values given above were determined by matching the samples after heating and dissolving in acetone in the proportion of 3 grams of the ester in 10 grams of acetone with heat-test standards. In the case of cellulose triacetate, the solvent used is methylenechloride-alcohol (9:1), and 1 gm. of ester is dissolved in 10 gms. of solvent. These standards range from 400 (dark amber) to 0. The 400 color is that which results when 0.2 gram of Ciba oil-soluble yellow BB, 0.2 gram of Calco fast spirit orange R and 0.022 gram of General Dyestuffs Alizarine cyanine green G Ex. Conc. is dissolved in 1 liter of dimethyl phthalate. The 0 standard is the original color of the dimethyl phthalate, and the values between 0 and 400 are graduated therebetween. For instance, if the solution having a value of 400 is diluted with a liter of dimethyl phthalate, the resulting solution would have a value of 200. If diluted with 3 liters of dimethyl phthalate, the color value is 100, and diluted with 39 liters of dimethyl phthalate the color value of the resulting solution is 10 (one fortieth of 400). A further explanation of the use of this color test is given in my application Serial No. 222,166.

The intrinsic viscosity in acetic acid of the cellulose ester, after its having been subjected to heat, is indicative of the degree of its general breakdown. A cellulose ester degraded below an intrinsic viscosity value of 1 loses its value for plastic purposes. The intrinsic viscosity of the cellulose ester is determined by measuring the flow rate of a solution of 0.25 gram of the material made up to 100 cc. with glacial acetic acid (or, in the case of cellulose triacetate, with formic acid). A measure of the flow time of the solution gives the relative viscosity. Relative viscosity equals $$\frac{\text{flow time for solution}}{\text{flow time for solvent}}$$

From this the intrinsic viscosity $n$ may be determined by multiplying the logarithm of the relative viscosity by 9.20.

I claim:
1. A lower fatty acid ester of cellulose the combined sulfur content of which has been neutralized with a neutralizing salt selected from the group consisting of the formates, acetates, lactates and citrates of magnesium, calcium, barium and aluminum and the alkali metal salts of weak organic acids to which ester has been added a monohydroxy, monocyclic, substituted phenol, the substituents of which are radicals selected from the group consisting of methoxy and aliphatic hydrocarbon radicals of 1–4 carbon atoms which phenol inhibits the tendency of the metallic cation of the neutralizing salt to catalyze the formation of carboxylic acid groups in the cellulose ester at an elevated temperature.

2. A lower fatty acid ester of cellulose the combined sulfur content of which has been neutralized with a neutralizing salt selected from the group consisting of the formates, acetates, lactates, and citrates of magnesium, calcium, barium and aluminum and the alkali metal salts of weak organic acids, containing therein a monohydroxy, monocyclic, substituted phenol the substituents of which are radicals selected from the group consisting of methoxy and aliphatic hydrocarbon radicals of 1–4 carbon atoms and 0.1–5% of a glycidyl ether which contains only C, H and O, boils within the range of 140–385° and shows no decomposition at a temperature of 200° C., which phenol inhibits the tendency of the metallic cation of the neutralizing salt to catalyze the formation of carboxylic acid groups in the cellulose ester at an elevated temperature, the glycidyl ether acting as an acceptor of any carboxylic acid groups which might be formed in the composition.

3. A cellulose acetate the combined sulfur content of which has been neutralized with a neutralizing salt selected from the group consisting of the formates, acetates, citrates and lactates of magnesium, calcium, barium and aluminum and the alkali metal salts of weak organic acids to which ester has been added a monohydroxy, monocyclic substituted phenol, the substituents of which are radicals selected from the group consisting of methoxy and aliphatic hydrocarbon radicals of 1–4 carbon atoms which phenol inhibits the tendency of the metallic cation of the neutralizing salt to catalyze the formation of carboxylic acid groups in the cellulose ester at an elevated temperature.

4. A cellulose acetate butyrate the combined sulfur content of which has been with a neutralizing salt selected from the group consisting of the formates, acetates, lactates and citrates of magnesium, calcium, barium and aluminum and the alkali metal salts of weak organic acids to which ester has been added a monohydroxy, monocyclic, substituted phenol, the substituents of which are radicals selected from the group consisting of methoxy and aliphatic hydrocarbon radicals of 1–4 carbon atoms, which phenol inhibits the tendency of the metallic cation of the neutralizing salt to catalyze the formation of the carboxylic acid groups in the cellulose ester at an elevated temperature.

5. A lower fatty acid ester of cellulose the combined sulfur content of which has been neutralized by a neutralizing salt selected from the group consisting of the formates, acetates, lactates and citrates of magnesium, calcium, barium and aluminum and the alkali metal salts of weak organic acids to which has been added thymol in sufficient amount to inhibit the tendency of the metallic cation of the neutralizing salt to catalyze the formation of carboxylic acid groups in the cellulose ester at an elevated temperature.

6. A lower fatty acid ester of cellulose the combined sulfur content of which has been neutralized with a neutralizing salt selected from the group consisting of the formates, acetates, lactates and citrates of magnesium, calcium, barium and aluminum and the alkali metal salts of weak organic acids to which has been added a monohydroxy, monocyclic, substituted phenol the substituents of which are radicals selected from the group consisting of methoxy and aliphatic hydrocarbon radicals of 1-4 carbon atoms which phenol inhibits the tendency of the metallic cation of the neutralizing salt to catalyze the formation of carboxylic acid groups in the cellulose ester at elevated temperatures and .01-5% of resorcinol diglycidyl ether.

7. A cellulose acetate butyrate the combined sulfur content of which has been neutralized with a magnesium neutralizing agent to which cellulose ester has been added a monohydroxy, monocyclic, substituted phenol the substituents of which are radicals selected from the group consisting of methoxy and aliphatic hydrocarbon radicals of 1-4 carbon atoms which phenol inhibits the tendency of magnesium cation to catalyze the formation of carboxylic acid groups in the cellulose ester at an elevated temperature.

8. A cellulose acetate butyrate the combined sulfur content of which has been neutralized with a magnesium neutralizing agent to which ester has been added a monohydroxy, monocyclic, substituted phenol the substituents of which are radicals selected from the group consisting of methoxy and aliphatic hydrocarbon radicals of 1-4 carbon atoms which phenol inhibits the tendency of magnesium cation to catalyze the formation of carboxylic acid groups in the cellulose ester at an elevated temperature, and resorcinol diglycidyl ether.

9. A cellulose acetate butyrate the combined sulfur content of which has been completely neutralized with a magnesium neutralizing agent to which ester has been added thymol in sufficient amount to inhibit the tendency of magnesium cation to catalyze the formation of carboxylic acid groups in the cellulose ester at an elevated temperature.

10. A composition of matter resistant to the effects of high temperature which comprises a lower fatty acid ester of cellulose the combined sulfur content of which has been neutralized with a neutralizing salt selected from the group consisting of formates, acetates, lactates and citrates of magnesium, calcium, barium and aluminum and the alkali metal salts of weak organic acids to which ester has been added a monohydroxy, monocyclic, substituted phenol the substituents of which are radicals selected from the group consisting of methoxy and aliphatic hydrocarbon radicals of 1-4 carbon atoms which phenol inhibits the tendency of the metallic cation of the neutralizing salt to catalyze the formation of carboxylic acid groups in the cellulose ester at an elevated temperature and a heat stable plasticizer.

References Cited in the file of this patent

UNITED STATES PATENTS

| | | |
|---|---|---|
| 1,607,474 | Mork | Nov. 16, 1926 |
| 2,125,961 | Shoemaker | Aug. 9, 1938 |
| 2,154,822 | Quisling | Apr. 18, 1939 |
| 2,329,705 | Dreyfus | Sept. 21, 1943 |
| 2,333,577 | Koch | Nov. 2, 1943 |
| 2,407,209 | Swan | Sept. 3, 1946 |
| 2,433,008 | Whitaker | Dec. 23, 1947 |
| 2,453,634 | Marple | Nov. 9, 1948 |
| 2,535,290 | Ivett et al. | Dec. 26, 1950 |

OTHER REFERENCES

"Uses and Applications of Chemical and Related Materials," vol. II, Gregory, pages 327 and 8.